(12) United States Patent
Yeap

(10) Patent No.: US 6,546,057 B1
(45) Date of Patent: Apr. 8, 2003

(54) SUPPRESSION OF RADIO FREQUENCY INTERFERENCE AND IMPULSE NOISE IN COMMUNICATIONS CHANNELS

(75) Inventor: Tet Hin Yeap, Ottawa (CA)

(73) Assignee: Bell Canada, Montreal (CA)

( * ) Notice: Subject to any disclaimer, the term of this patent is extended or adjusted under 35 U.S.C. 154(b) by 0 days.

(21) Appl. No.: 09/313,179

(22) Filed: May 18, 1999

(30) Foreign Application Priority Data

Jun. 4, 1998 (CA) ............................................. 2239675

(51) Int. Cl.[7] .............................................. H04B 15/00
(52) U.S. Cl. ...................... 375/285; 375/346
(58) Field of Search ............................... 375/346, 258, 375/285, 222, 229, 231, 257, 316

(56) References Cited

U.S. PATENT DOCUMENTS

| | | | |
|---|---|---|---|
| 4,527,261 A | 7/1985 | Smither | 367/76 |
| 5,410,264 A | 4/1995 | Lechleider | 327/311 |
| 6,052,420 A * | 4/2000 | Yeap et al. | 375/346 |
| 6,169,638 B1 * | 1/2001 | Morling | 360/46 |

FOREIGN PATENT DOCUMENTS

| | | | |
|---|---|---|---|
| EP | 0 773 642 A2 | 5/1997 | H04B/15/00 |
| WO | WO 97/17767 | 5/1997 | H04B/3/32 |
| WO | WO 97/40587 | 10/1997 | H04B/3/32 |
| WO | 9809383 | * 3/1998 | H04B/1/66 |

OTHER PUBLICATIONS

*Wavelet and Subband Transforms: Fundamentals and Communication Applications*, Ali N. Akansu et al, IEEE Communications Magazine, vol. 35, No. 12, Dec. 1997.

*Multirate Signal Processing*, by G. Zelniker and F. Taylor, extract from Chapter 7 of the text book "Advanced Digital Signal Processing: Theory and Applications", publ. Marcel Dekker, Inc.

* cited by examiner

Primary Examiner—Chi Pham
Assistant Examiner—Kevin M Burd
(74) Attorney, Agent, or Firm—Thomas Adams

(57) ABSTRACT

A noise suppression circuit for a communications channel (10) comprises a hybrid device (11) coupled to the channel for providing a differential output signal corresponding to a received signal. A delay unit (12) delays the differential signal by a suitable amount to allow for the generation and subtraction of a noise estimate. A summing device (13) extracts a digital common mode signal from the channel, and a noise estimation unit (16) provides a common mode noise estimate signal in dependence upon a history of the common mode signal over a predetermined period of time and over a plurality of frequency bands. The common mode noise estimate signal is combined subtractively (19) with the delayed differential signal to cancel common mode noise elements of the delayed differential signal. The noise estimation unit may comprise an analysis filter bank (20) for producing a plurality of subband signals ($S_1$–$S_M$), each at a different one of a plurality of different frequencies, a plurality of noise detection circuits ($23_1$–$23_M$), each for processing a respective one of the plurality of subband signals to provide a component of the common mode noise estimate signal, and a synthesis filter bank (24) for processing the common mode noise signal components to provide the noise estimate signal.

7 Claims, 7 Drawing Sheets

SUPPRESSION OF RADIO FREQUENCY INTERFERENCE AND IMPULSE NOISE IN COMMUNICATIONS CHANNELS

BACKGROUND OF THE INVENTION

1. Technical Field Art

The invention relates to a method and apparatus for reducing noise in signals transmitted via communications channels and is especially, but not exclusively, applicable to the suppression of common mode noise, including radio frequency interference and/or impulse noise, in digital subscriber loops of telecommunications systems. The invention is especially applicable to two-wire or "twisted pair" subscriber loops.

2. Background Art

In the telephone system, noise may comprise radio frequency interference (RI) produced by commercial radio stations in the vicinity of the communications channel. Impulse noise may be caused by a number of phenomena, including switching transients in the central office equipment, or the station apparatus, or from electrical power equipment connected to power lines that run adjacent the telephone subscriber loops. Impulse noise may also be caused by technicians working on the subscriber loops, or even by lightning. Generally, impulse noise will occupy a broader bandwidth than RFI.

When signals transmitted in telephone subscriber loops were at relatively low frequencies, perhaps 3,000 Hz or 4,000 Hz, common mode noise could be dealt with adequately by using twisted wire cable and hybrid transformers to help cancel out any induced interference noise. With the introduction of digital subscriber loops, especially very high speed digital subscriber loops (VDSL) and asymmetric digital subscriber loops (ADSL), the operating frequency approaches the radio frequency bands and conventional techniques, such as balancing of the cable, are no longer sufficient to suppress radio frequency or impulse noise.

Copending Canadian patent application No. 2,237,460, filed May 13, 1998, discloses a method of reducing radio frequency interference in digital subscriber loops in which a common mode signal is extracted from the Tip and Ring of the subscriber loop and applied to a plurality of narrowband filters which are tuned to a corresponding plurality of passbands. A noise detection unit detects the noisiest passband and tunes one of the narrowband filters to that passband. The process is repeated for each of the other narrowband filters in turn to suppress the RFI signals in the corresponding bands. Such adaptive techniques are not suitable, however, for suppressing impulse noise which typically has a very short duration, a relatively wide bandwidth, and occurs substantially randomly so that it has no "history" allowing adaptation to be used.

U.S. Pat. No. 5,410,264 (Lechleider) issued April 1995 discloses a technique for cancellation of impulse noise in digital subscriber loops. The technique is predicated upon the assumption that, for a particular installation, the impulse noise will generally not be totally random in shape, size and time of occurrence and so can be replicated. Accordingly, Lechleider discloses a technique for estimating one or more of the shape, amplitude and arrival time of an impulse in order to produce a replica which is then subtracted from the original signal. Lechleider is concerned only with impulse noise and his technique cannot be used for radio frequency interference. A further disadvantage is the need for complex calculations to detect impulses and produce replicas.

An object of the present invention is to eliminate, or at least mitigate, some or all of these disadvantages and provide a noise suppression circuit which is better suited to the suppression of radio frequency and/or impulse noise in communications channels.

SUMMARY OF THE INVENTION

According to the present invention, there is provided noise suppression apparatus for a communications channel, comprising a hybrid device for coupling to the channel for providing a differential signal corresponding to a signal received from the channel; extraction means for coupling to the channel for extracting a common mode signal from said channel; a noise estimation unit comprising means for deriving from said common mode signal a plurality of digital signals each representing a different one of a plurality of frequency hands of the common mode signal and a plurality of noise detection means for deriving from the digital signals a plurality of noise estimate signals, respectively; means for combining selected samples of the noise estimate signals to provide a common mode noise estimate signals; a delay unit coupled to an output of the hybrid device for delaying said differential signal such common noise estimating signal corresponds temporally with the differential signal; and meaning for subtracting the common mode noise estimate signal from delayed differential to form a noise reduced output signal; wherein each of the noise detector means comprises selector means for selecting a respective one of said selected samples independence upon whether or not a measure of a plurality of previous sample of the corresponding one of the digital signal exceeds a predetermined threshold level.

In preferred embodiments, the noise estimation means comprises an analysis filter bank responsive to the common mode signal for producing a plurality of subband signals, each at a different one of the plurality of different frequencies, a plurality of noise detection means, each coupled to the analysis filter bank to receive a respective one of the plurality of subband signals and provide therefrom a component of said common mode noise estimate signal, and a synthesis filter bank for processing the common mode noise signal components from the plurality of noise detection means to provide said noise suppressed output signal.

The common mode signal extracted from the channel is analog, but maybe converted to a digital signal by an analog-to-digital converter between the extraction means and the digital noise estimator. Each noise detection means may then comprise means operable in each sample period for monitoring and Summing a plurality of previous samples of the corresponding subband signal, means for comparing the sum with a predetermined threshold, and selector means for select in dependence upon said comparison, either a zero value or an instant value of the inverted subband signal and supplying the selected value to a respective one of a plurality of subband inputs of the synthesis filter bank.

The analysis filter bank and the synthesis filter bank may comprise multiresolution filter banks, some of the subband signals having narrower bandwidths than others of the subband signals.

The term "subband signals" is used herein to refer to a plurality of narrowband signals produced by an analysis filter bank of the kind disclosed in an article entitled "Perfect-channel Splitting By Use of Interpolation and Decimation Tree Decomposition Techniques", Proc. Intl. Conf. Inform. Sci. Syst., pp. 443–446, Aug. 1976, by A. Crosier, D. Esteban and C. Galand. Such analysis filter banks permit "perfect reconstruction" of the original signal by means of a complementary synthesis filter bank. For a more recent discussion of the subband transforms involved, which include certain wavelet transforms, the reader is directed to an article entitled "Wavelet and Subband Transforms: Fundamentals and communication Applications", Ali N. Akansu et al, IEEE Communications Magazine, Vol. 35, No. 12, December 1997. Both of these articles are incorporated herein by reference. Providing the analysis filter bank and synthesis filter bank satisfy certain conditions, as set out in the article by Akansu et al, "perfect reconstruction" can be achieved. In a practical implementation, such as in a telecommunications system, some distortion may be acceptable, so it may be possible to use an analysis filter bank which does not quite meet the conditions set out in Akansu et al's article, and provides only so-called "pseudo perfect reconstruction".

In the context of the present invention, and hereafter in this specification, the term "analysis filter bank" refers to a filter bank meeting the afore-mentioned conditions for "perfect reconstruction", or the conditions for "pseudo-prefect reconstruction", and the term "subband signals" refers to signals produced by such an analysis filter bank.

BRIEF DESCRIPTION OF THE DRAWINGS

Various features, objects, aspects and advantages of the present invention will become apparent from the following description of preferred embodiments of the invention, taken in conjunction with the attached drawings, which are described by way of example only, In the drawings.

DESCRIPTION OF THE PREFERRED EMBODIMENT(S)

Figure 1:
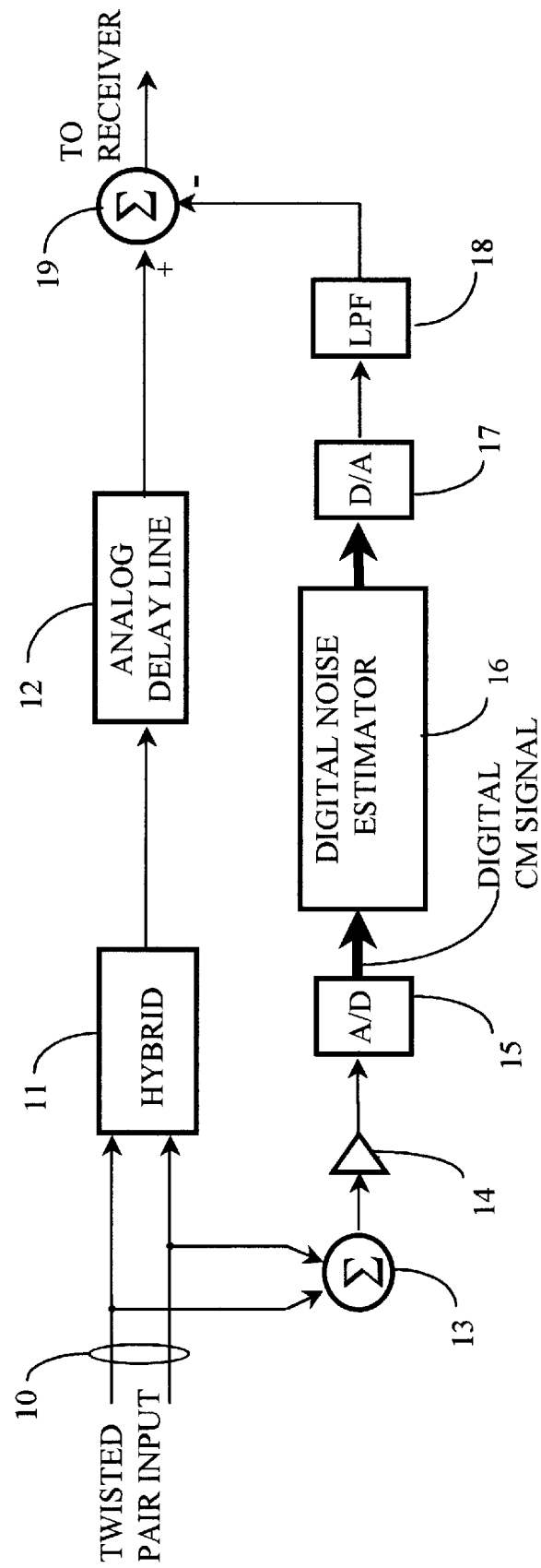
FIG. 1 is a block schematic diagram of a noise suppression circuit for a two-wire communications channel.

Referring now to FIG. 1, in a noise suppression circuit according to an embodiment of the invention, the TIP and RING wires of a twisted pair subscriber loop 10 are coupled to the respective inputs of a hybrid device in the form of a circuit or transformer 11 and also to respective inputs of a summer 13 which extracts a common mode signal. The output of the hybrid device 11 is coupled by way of an analog delay line 12 to one input of a summer 19, the output of which is coupled to the usual receiver (not shown). The hybrid device 11 converts the signal received from subscriber loop 10 to a differential signal which includes a component corresponding to common mode noise in the received signal.

The common mode signal from summing device 13 is amplified by an amplifier 14 and applied to a noise estimation unit comprising an analog-to-digital converter 15 and a digital noise estimator 16. The amplified common mode noise signal is converted to a digital signal by analog-to-digital converter 15. The digital signal from analog-to-digital converter 15 is processed by a digital noise estimator unit 16 and the noise estimate signal therefrom converted to an analog noise estimate signal by digital-to-analog converter 17. The analog noise estimate signal is passed through a lowpass filter 18 to remove any quantisation noise from the digital-to-analog converter 17. The output of the lowpass filter 18, i.e., the digital noise estimate signal, is combined with the delayed differential signal by summing device 19. The digital noise estimator 16 produces a digital noise estimate signal which is inverted relative to the common mode component of the differential signal so addition by summing device 19 causes the digital noise estimate signal to cancel, substantially, the corresponding common mode noise component of the differential signal supplied to the receiver (not shown).

The duration of the delay provided by delay line 12 is selected to compensate for delay introduced in the digital noise estimator which, typically, would be several microseconds.

Figure 2:
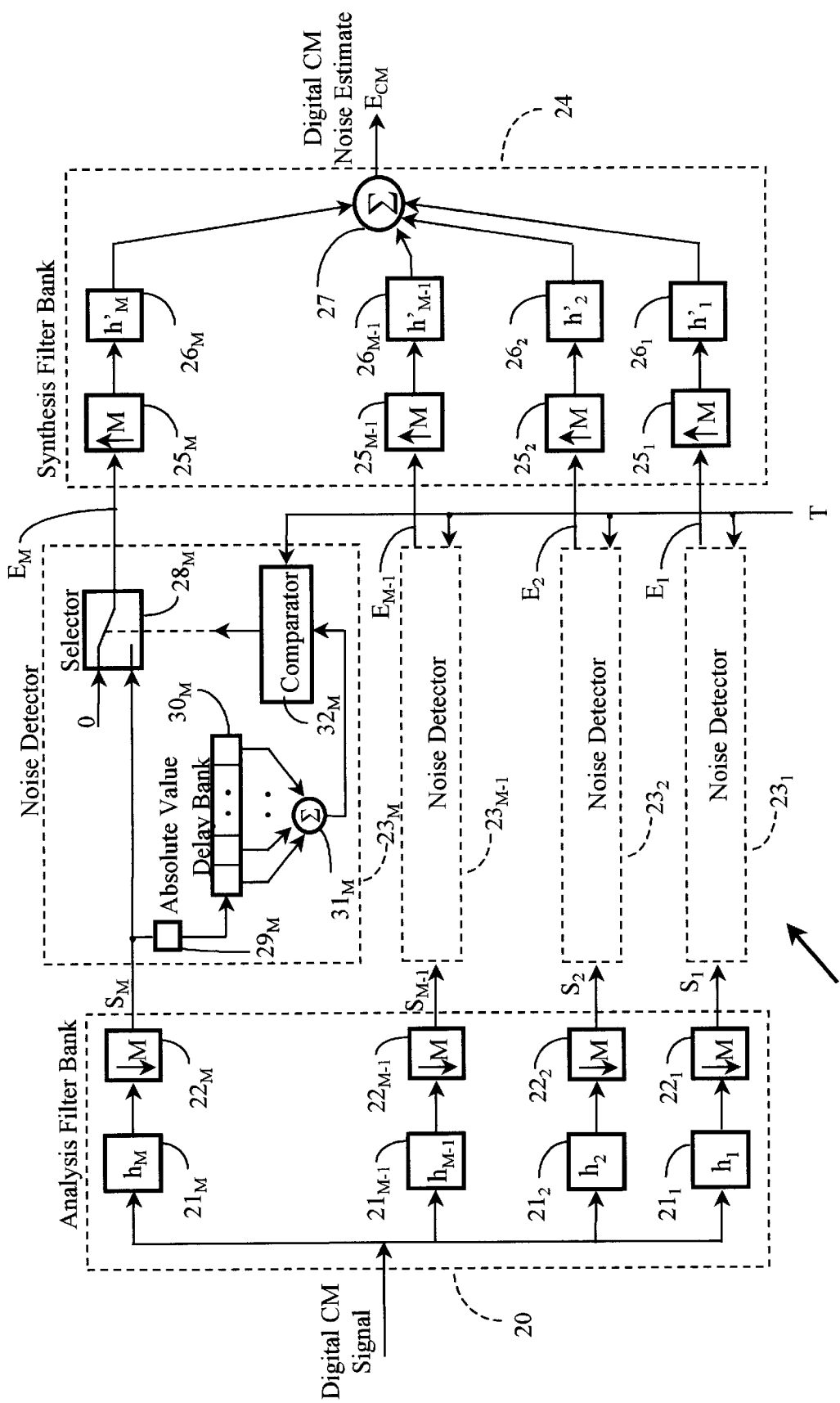
FIG. 2 is a block schematic diagram showing in more detail a delay bank and other components of the noise suppression circuit of FIG. 1.

FIG. 2 shows the digital noise estimator 16 in more detail. In the digital noise estimator 16, the digital common mode signal is supplied to an analysis filter bank 20 which comprises a lowpass filter $21_1$, a plurality of bandpass filters $21_2$ to $21_{M-1}$ each having a different centre frequency, and a highpass filter $21_M$. The narrowband signals from the filters $21_1$ to $21_M$ are supplied to respective ones of a corresponding plurality of downsamplers $22_1$ to $22_M$, each of which downsamples by a factor M. In this preferred embodiment, the downsampling rate M is equal to the number of subbands, i.e., the analysis filter bank 20 is uniformly, maximally decimated.

The plurality of subband signals $S_1$ to $S_M$ are applied to a corresponding plurality of noise detection circuits $23_1$, to $23_M$, respectively, the outputs of which comprise respective subband noise estimate signals $E_1$ to $E_M$. The subband noise estimate signals $E_1$ to $E_M$ are supplied to respective inputs of a synthesis filter bank 24. The analysis filter bank 20 and the synthesis filter bank 24 are complementary and designed to provide "pseudo perfect reconstruction" as described earlier. Thus, synthesis filter bank 24 comprises a plurality of upsamplers $25_1$ to $25_M$ which receive and upsample the digital subband noise estimate signals $E_1$ to $E_M$, respectively, by the factor M (the same as the downsampling rate in the analysis filter 20). The outputs of the upsamplers $25_1$ to $25_M$ are supplied to a corresponding plurality of bandpass filters $26_1$ to $26_M$, respectively. The outputs of the filters $26_1$ to $26_M$ are summed by summing device 27 for output to the D/A converter 17 (FIG. 1). It should be noted that the filters $26_1$ to $26_M$ in the synthesis filter bank 24 are not identical to the corresponding filters $21_1$ to $21_M$ in the analysis filter bank 20. The relationship between the analysis filter bank 20 and the synthesis filter bank 24, and especially the coefficients of their filters, is known to those skilled in this art and so will not be described in detail here. For details, the reader is directed to chapter 7 entitled "Multirate Signal Processing" of the text book"Advanced Digital Signal Processing: Theory and Applications", by G. Zelniker and F. Taylor, publ. Marcel Dekker, Inc., and to the technical literature, including the articles by Akansu et al and by Crosier et al supra.

The noise detection circuits $23_1$ to $23_M$ have identical structures so only one circuit $23_M$ is shown in detail in FIG. 2, for simplicity.

The components of the noise detection circuit $23_M$ are controlled by a common clock which, for convenience of illustration, is not shown. Within the noise detection circuit $23_M$, each sample value of the subband signal $S_M$ is applied to one input of a selector $28_M$, which may be a multiplexer, and to an absolute value device $29_M$ which strips off the sign and supplies the sample value to an input of a delay bank $30_M$. The outputs of the delay bank $29_M$ are supplied in parallel to a summing device $31_M$, which sums them and supplies the sum to a comparator $32_M$. The selector $28_M$ is controlled by the output of the comparator $32_M$ to select either the instant sample of the subband signal or a zero value and supply it to the corresponding input of the synthesis filter bank 24. The subband signal $S_M$ is clocked through the delay bank $29_M$ continuously. The values in the delay bank $29_M$ in any clock cycle are summed by the summing device $31_M$ and the summation value compared with a threshold value T. If the summation value is greater than the threshold value T, the output of comparator $32_M$ is a "1" causing selector $28_M$ to select the instant sample value of the subband signal $S_M$, and supply it as the digital noise estimate signal $E_M$ for channel M to the corresponding input of synthesis filter bank 24. If the summation value is less than the threshold T, the comparator $32_M$ supplies a zero to selector $28_M$ causing it to provide a zero value as the digital noise estimate signal $E_M$. Thus, when the subband signal $S_M$ contains a certain common mode noise component, the instant sample value of subband signal $S_M$ is supplied as the digital noise estimate signal $E_M$. Otherwise, no value is supplied.

The other noise detection and phase inversion circuits $23_1$ to $23_{M-1}$ produce corresponding digital noise estimate signals $E_1$ to $E_{M-1}$ in a similar manner. In the embodiment of FIG. 2, all of the noise detection units $23_1$ to $23_M$ use the same threshold value T. It should be appreciated, however, that they could use different threshold values $T_1$ to $T_M$, respectively.

Generally, each threshold value will be selected according to the nature of the noise in the corresponding subband frequency band. In general, impulse noise will tend to be rather large in amplitude compared to radio frequency interference but of shorter duration. Consequently, each threshold value $T_1$ to $T_M$ may be selected so that the threshold value will be exceeded if a small number of segments of the corresponding one of the delay banks $30_1$ to $30_M$ contain relatively high values; or all of the segments of the delay bank contain somewhat lower values, as would occur with a radio frequency interference signal. Hence, the length of the delay banks $30_1$ to $30_M$, any scaling factors of the signal supplied to the analysis filter bank, and the threshold would be arranged or could be adjusted to suit particular conditions prevailing in the vicinity of the installation.

It should be appreciated that, although the specific embodiment uses a uniformly, maximally decimated analysis filter bank, other structures are feasible. For example, the analysis filter bank could provide a plurality of subband signals concentrated at the higher frequencies where radio frequency or impulse noise might be a greater problem due to the relatively lower energy of the transmitted signal.

Figure 3A:
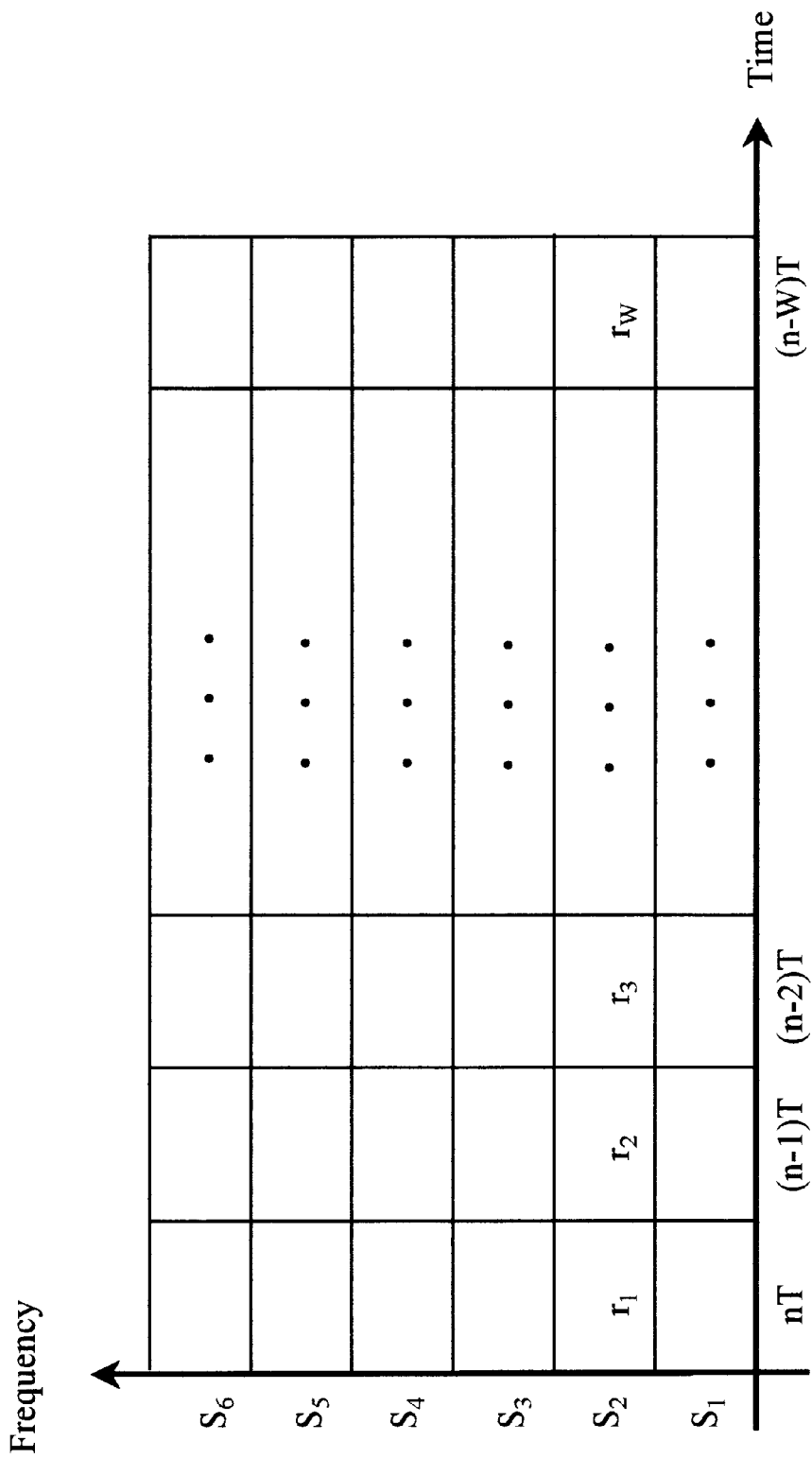
FIG. 3A illustrates contents of the delay bank according to time and frequency for radio frequency interference.

Thus, FIG. 3A illustrates the contents of the delay banks $30_1$ to $30_M$ when there is RFI in one band only, namely that corresponding to subband signal $S_2$. The entire row, ie. all segments of the delay bank $30_2$, hold values $r_1$ to $r_w$ which are greater than the threshold T. The values in the other delay banks are not greater than the threshold and so are not shown.

Figure 3B:
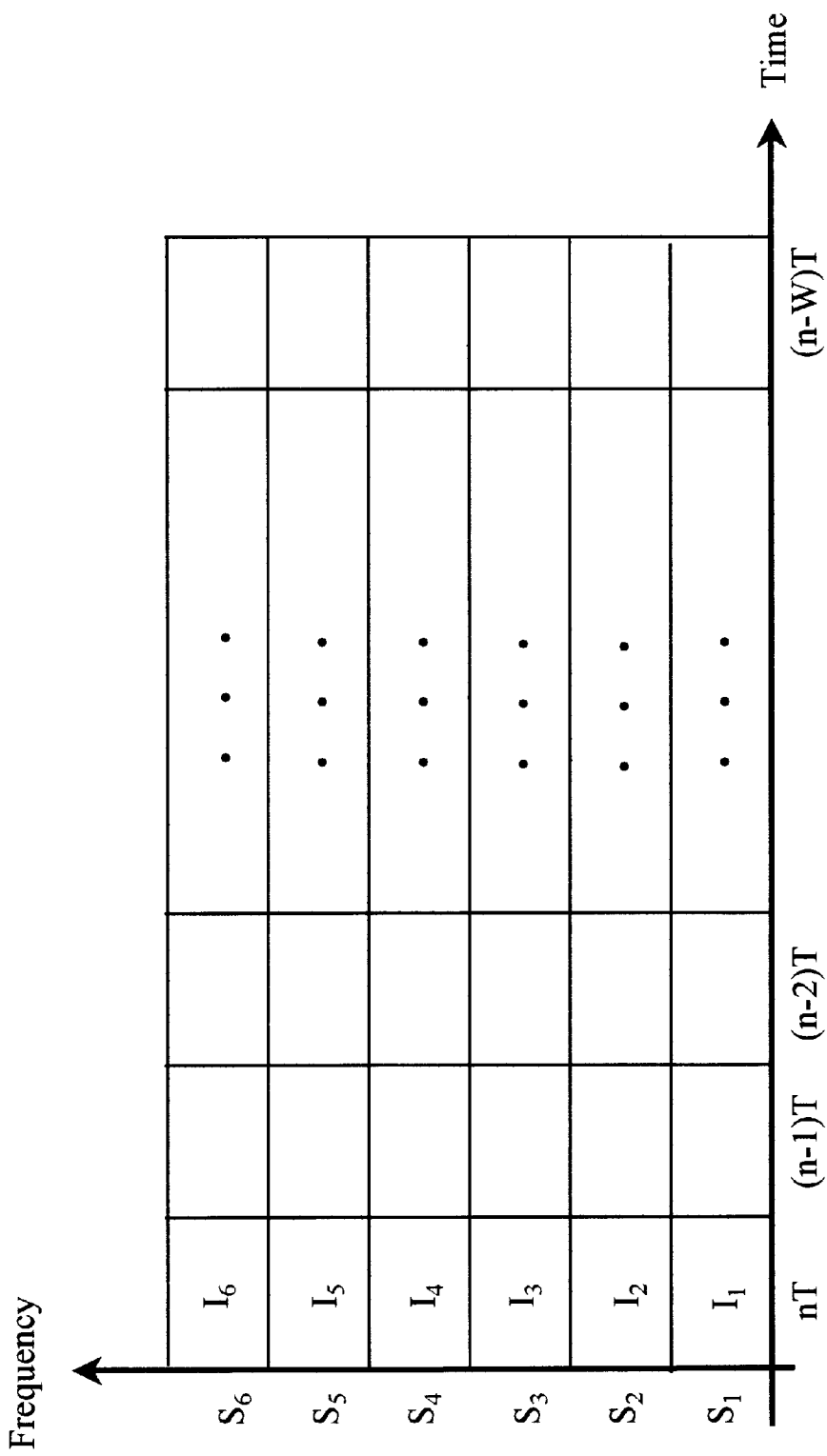
FIG. 3B illustrates contents of the delay bank according to time and frequency for impulse noise.

FIG. 3B illustrates the contents of the delay banks $30_1$ to $30_M$ when only impulse noise is present. In this case, because the impulse noise is of short duration but wide bandwidth, there are values greater than the threshold in all delay banks, but only in the first segment of each. Of course, if the impulse noise is of longer duration, it might occupy more segments.

It will be appreciated that both RFI and impulse noise often will occur together in which case the contents of the delay banks could be represented by combining FIGS. 3A and 3B.

The analysis filter means may be uniform, for example an M-band filter bank or a Short-time Fast Fourier Transform unit, or non-uniform, for example a "multiresolution" filter bank such as an octave-band or dyadic filter bank which will produce sub-bands having different bandwidths, typically each half the width of its neighbour. The analysis filter bank means may comprise an octave band filter bank implementing discrete wavelet transform (DWT).

Figure 4:
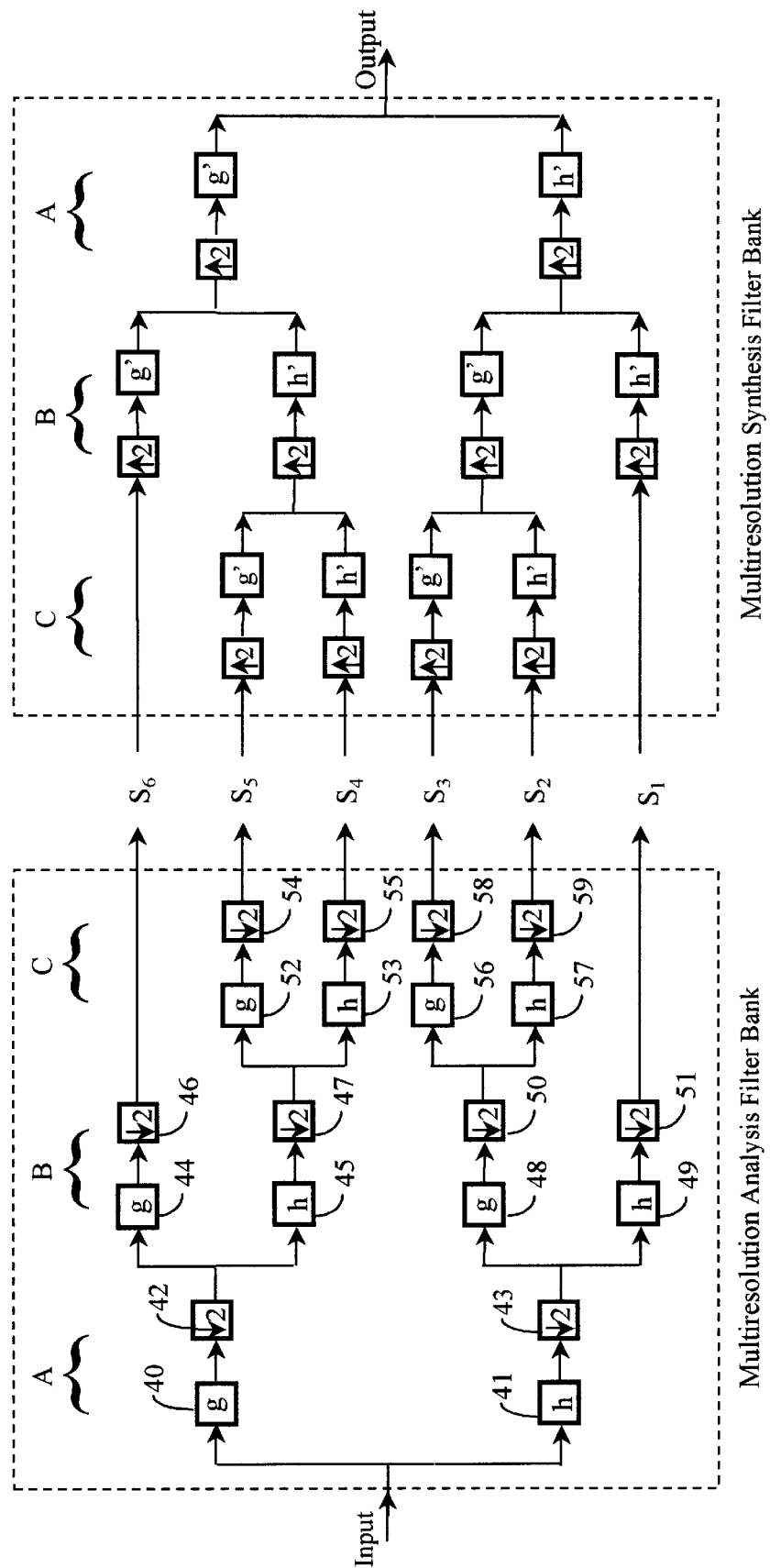
FIG. 4 is a simplified schematic block diagram of multiresolution analysis and synthesis filter banks for use in the noise suppression circuit of FIG. 1.

FIG. 4 illustrates a six-band multiresolution analysis filter bank 20' and a corresponding six-band multiresolution synthesis filter bank 24' which may be substituted for the corresponding components of FIG. 1. The analysis filter bank 20' comprises three decomposition stages, each splitting the input signal into low- and high-pass components. Thus, in the first stage A, a first high pass filter 40 and a first low pass filter 41 connected to the input of the analysis filter bank 20' receive the digital common mode signal. The outputs of the filters 40 and 41 are downsampled by a factor of 2 by a pair of downsamplers 42 and 43, respectively, and passed to stage B, where the high pass component is decomposed again, in a similar manner, by a second high pass filter 44, second low pass filter 45, and downsamplers 46 and 47. In stage B, the low pass component is decomposed by a third high pass filter 48, third low pass filter 49, and downsamplers 50 and 51. The outputs from downsamplers 46 and 51 comprise the sixth subband signal $S_6$ and the first subband signal $S_1$, respectively. In stage C, the output from downsamplers 47 is decomposed yet again by fourth high pass filter 52, fourth low pass filter 53, and downsamplers 54 and 55 to provide subband signals $S_4$ and $S_5$. Likewise, in stage C, the output from downsampler 50 is decomposed by a fifth high pass filter 56, fifth low pass filter 57, and downsamplers 58 and 59 to provide subband signals $S_2$ and $S_3$.

The components of the synthesis filter bank 24' constitute, in effect, a mirror image of the components of the analysis filter bank 20' and so will not be described in detail.

Figure 5:
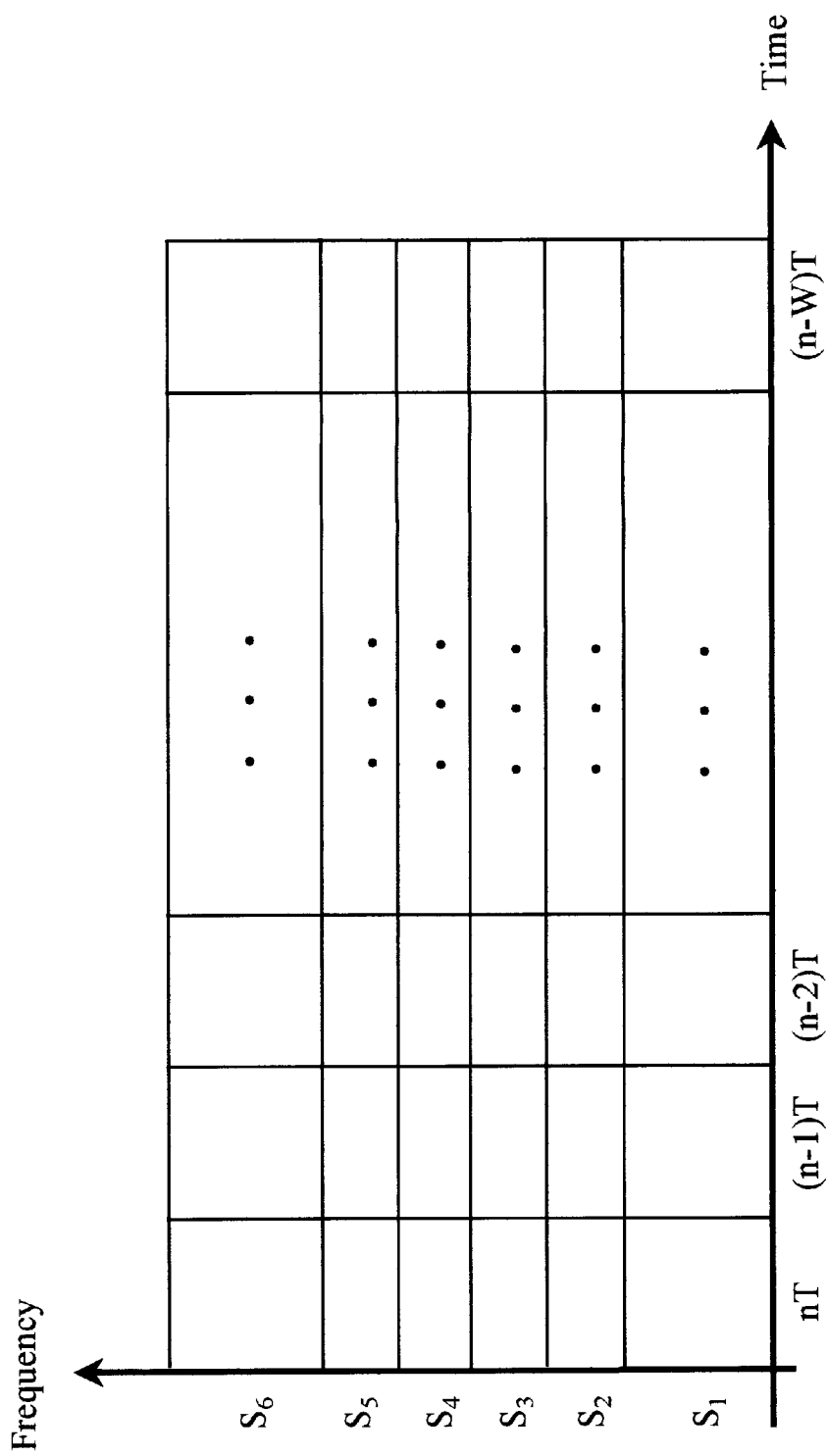
FIG. 5 illustrates time-frequency distribution of subband signals of the noise suppression circuit using the multiresolution analysis and synthesis filter banks.

Each pair of a high pass filter and a low pass filter split the corresponding input signal into two equal bands. Consequently, as illustrated in FIG. 5, the four subbands signals $S_2$, $S_3$, $S_4$ and $S_5$ will each have half of the bandwidth of the subband signals $S_1$ and $S_6$. Hence, the analysis filter bank 20' provides non-linear resolution which is higher in the frequency band corresponding to subbands $S_2$ to $S_5$.

It should be appreciated that higher resolution could be provided in other parts of the frequency band by suitable re-configuration of the components of analysis filter bank 20'. It is also envisaged that non-linear resolution could be provided in the time domain by providing an analog-to-digital converter 15 which performs fractional sampling of the input common mode signal and discarding selected samples in the delay banks.

Figure 6:
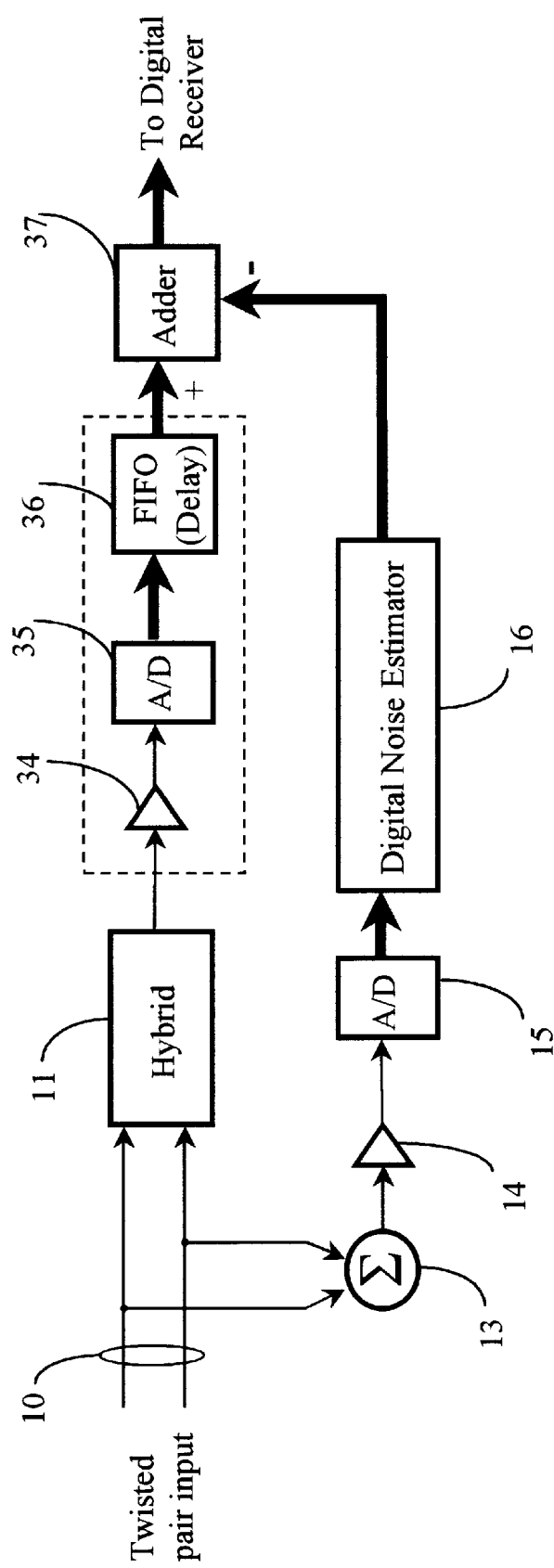
FIG. 6 is a block schematic diagram illustrating a modification of the noise suppression circuit of FIG. 1.

Various other modifications and substitutions are possible without departing from the scope of the present invention. Thus, FIG. 6 illustrates a modification of the noise suppression circuit of FIG. 1, which enables it to supply a digital output, allowing direct interfacing to a digital receiver. In the noise suppression circuit of FIG. 3, in which components corresponding to those in FIG. 1 have the same reference number, the analog delay line 12 is replaced by an amplifier 34, analog-to-digital converter 35, and a first-in first-out (FIFO) device 36. The summing device 19 is replaced by an adder 37. Hence, the differential signal from hybrid 11, including the common mode noise component, is amplified by amplifier 34, converted to a digital signal by A/D converter 35 and delayed by FIFO 36. The overall delay, of course, is similar to that provided in the digital/noise estimator. The output of the digital noise estimator unit 16 is supplied directly to the adder 37 which combines it with the delayed differential signal subtractively for output to the digital receiver (not shown). The D/A converter 17 and lower pass filter 18 of FIG. 1 are not required.

For a particular installation, the delay provided by analog delay line 12 or FIFO 36 can be constant.

Embodiments of the present invention are applicable to noise reduction in two-wire communications channels, such as twisted pair subscriber loops, operating at high frequencies, such as ADSL and VDSL rates.

Although embodiments of the invention have been described and illustrated in detail, it is to be clearly understood that the same are by way of illustration and example only and not to be taken by way of the limitation, the spirit and scope of the present invention being limited only by the appended claims.

What is claimed is:

1. Noise suppression apparatus for a communications channel (10), comprising:

(i) a hybrid device (11) for coupling to the channel for providing a differential signal corresponding to a signal received from the channel;

(ii) extraction means (13) for coupling to the channel for extracting a common mode signal from said channel;

(iii) a noise estimation unit (15,16,17) comprising means (15,20) for deriving from said common mode signal a plurality of digital signals ($S_1, \ldots, S_M$) each representing a different one of a plurality of frequency bands of the common mode signal and a plurality of noise detection means ($23_1, \ldots, 23_M$) for deriving from the digital signals ($S_1, \ldots, S_M$) a plurality of noise estimate signals ($E_1, \ldots, E_M$), respectively;

(iv) means (24) for combining selected samples of the noise estimate signals ($E_1, \ldots, E_M$) to provide a common mode noise estimate signal ($E_{CM}$);

(v) a delay unit (12) coupled to an output of the hybrid device (11) for delaying said differential signal such that the common mode noise estimate signal ($E_{CM}$) corresponds temporally with the delay differential signal; and (vi) means (19) for subtracting the common mode noise estimate signal ($E_{CM}$) from the delayed differential signal to form a noise-reduced output signal;

wherein each of the noise detector means ($23_1, \ldots, 23_M$) comprises selector means ($28_1, \ldots, 28_M$) for selecting a respective one of said selected samples in dependence upon whether or not a measure of plurality of previous samples of the corresponding one of the digital signals ($S_1, \ldots, S_M$) exceeds a predetermined threshold level (T).

2. Apparatus according to claim 1, wherein the noise estimation unit (15,16) comprises:

(vii) analog-to-digital converter means (15) for converting the extracted common mode signal to a digital signal;

(viii) analysis filter bank means (20) responsive to the digital signal for producing said plurality of digital signals as a plurality of subband signals ($S_1$–$S_M$), each at a different one of a plurality of different frequencies and having a bandwidth substantially narrower than the bandwidth of the common mode signal; and (ix) said plurality of noise detection means ($23_1$ to $23_M$), each having an input coupled to a respective one of a plurality of outputs of the analysis filter bank means (20) to receive a respective one of the plurality of subband signals ($S_1$–$S_M$) and an output for a respective one of a plurality of subband noise estimate signals ($E_1$ to $E_M$), each noise detection means comprising:

delay means ($30_1$–$30_M$) for storing successively an instant value of the subband signal and a plurality of values previous to the said instant value;

summing means ($31_1$–$31_M$) for summing each said instant value and corresponding plurality of previous values to produce a summation value as said measure, means ($32_1$–$32_M$) for comparing the summation value with said predetermined threshold value (T) and, in dependence upon the comparison, controlling the selector means ($28_1$–$28_M$) to select either the instant value of the subband signal or a zero value for application to the corresponding output, successive selected values constituting the corresponding one of said noise estimate signals ($E_1, \ldots, E_M$);

the noise estimation unit (16) further comprising (x) synthesis filter bank means (24) complementary to said analysis filter bank means (20) for processing the plurality of noise estimate signals ($E_1$–$E_M$) to form said noise estimate sign ($E_{CM}$).

3. Apparatus according to claim 2, wherein the analysis filter bank means (20) and the synthesis filter bank means (24) each comprise a multiresolution filter bank (FIG. 4), some of the subband signals ($S_1$–$S_M$) having narrower bandwidths than others of the subband signals.

4. Apparatus according to claim 2, wherein the delay means clocks sample values of the subband signal therethrough continuously.

5. Apparatus according to claim 2, wherein, in each noise detection means ($23_1$–$23_M$), the delay means clocks sample values of the subband signal therethrough continuously, and the analysis filter bank means (20) and the synthesis filter bank means (24) each comprise a multiresolution filter bank, some of the subband signals ($S_1$–$S_M$) having narrower bandwidths than others of the subband signals.

6. Apparatus according to claim 1, wherein each of the noise detector means ($23_1, \ldots, 23_M$) comprises means (30,31) for summing absolute values of said plurality of previous samples of the corresponding one of the plurality of digital ($S_1, \ldots, S_M$) and means (32) for comparing the sum obtained with said threshold level (T), and said selection means (28) selects a current sample of the corresponding digital signal for inclusion in the common mode noise estimate signal only if the sum exceeds the threshold level (T).

7. Apparatus according to claim 1, wherein the plurality of noise detector means ($S_1, \ldots, S_M$) compare their respective sums of previous samples with the same threshold level (T).

* * * * *